Feb. 18, 1936.  A. E. BERDON  2,030,909
RECORDING DEVICE
Filed Dec. 12, 1931   3 Sheets-Sheet 1

INVENTOR
A. E. Berdon
BY HIS ATTORNEYS

Feb. 18, 1936.    A. E. BERDON    2,030,909
RECORDING DEVICE
Filed Dec. 12, 1931    3 Sheets-Sheet 2

INVENTOR
A. E. Berdon
BY HIS ATTORNEYS

Feb. 18, 1936.  A. E. BERDON  2,030,909
RECORDING DEVICE
Filed Dec. 12, 1931   3 Sheets-Sheet 3
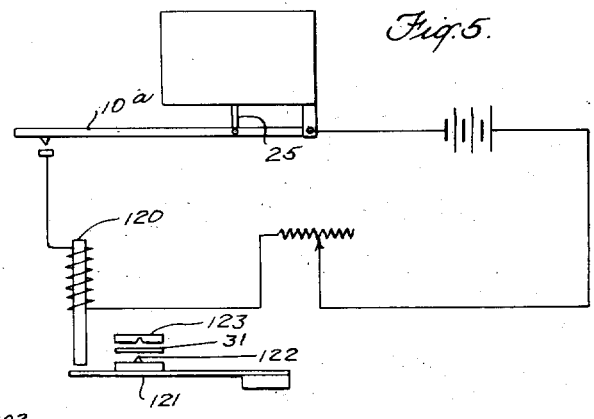
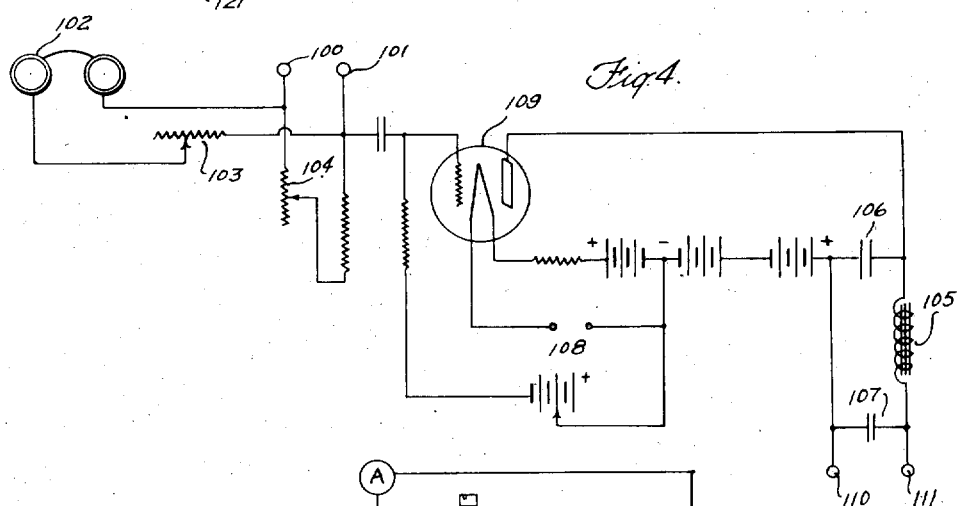
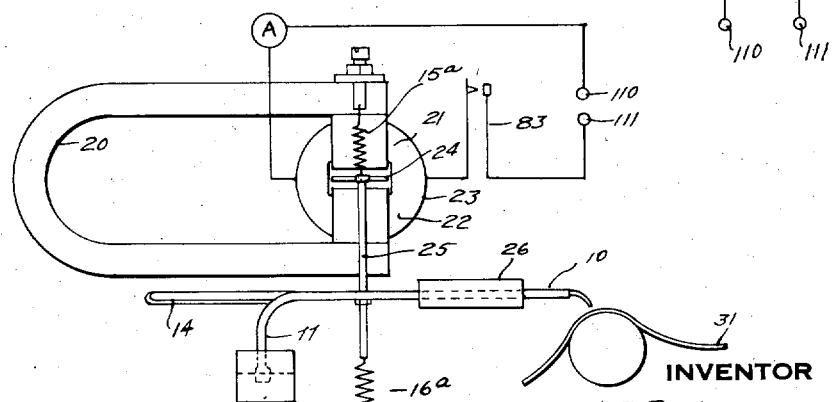
INVENTOR
A. E. Berdon
BY HIS ATTORNEYS Patented Feb. 18, 1936

2,030,909

UNITED STATES PATENT OFFICE 2,030,909

RECORDING DEVICE

Albert E. Berdon, Yellow Springs, Ohio, assignor to Antioch Industrial Research Institute, Inc., Yellow Springs, Ohio, a corporation of Ohio Application December 12, 1931, Serial No. 580,654

9 Claims. (Cl. 178—91)

This invention relates to a device for making a permanent record of electric signals, and particularly to a device which is adapted to record by magnetic means signals which are imposed upon very weak electrical currents. Although in the past there have been various methods of and devices for making records of electrical signals, yet most of such devices have required either strong electrical signal currents, or complicated and expensive apparatus. So far as I am aware, there has been no inexpensive and simple apparatus capable of satisfactorily recording signals carried upon weak currents such as radio broadcasting, etc. Accordingly, it is an object of my invention to provide a simple and inexpensive method and apparatus for recording electrical signals, even though represented by very weak current.

Although the apparatus of my invention is particularly adapted for recording code signals transmitted by radio, it may also be utilized for recording other types of signals, whether code messages or signals from control mechanisms, such as fire alarm signals, signals from automatic counters, signals from photoelectric devices, and in short any type of electrical signal, however produced.

In the accompanying drawings, I have illustrated a preferred embodiment of my invention:

Fig. 3 illustrates diagrammatically the recorder operating device shown in connection with the modified recording instrument;

Fig. 4 is a wiring diagram illustrating a circuit used in one embodiment of the invention; and Fig. 5 illustrates diagrammatically a modified form of the invention.

Figure 1:
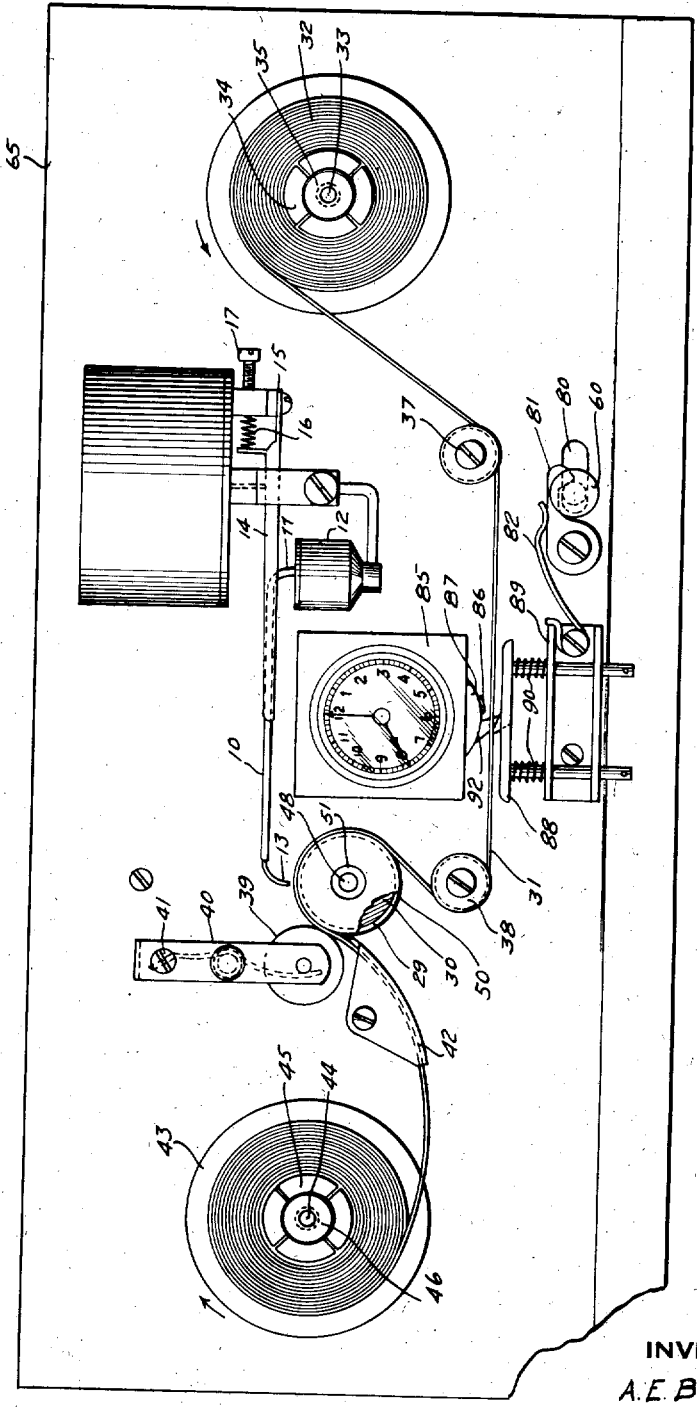
Fig. 1 shows in front elevation a recording unit constructed according to my invention.
Figure 2:
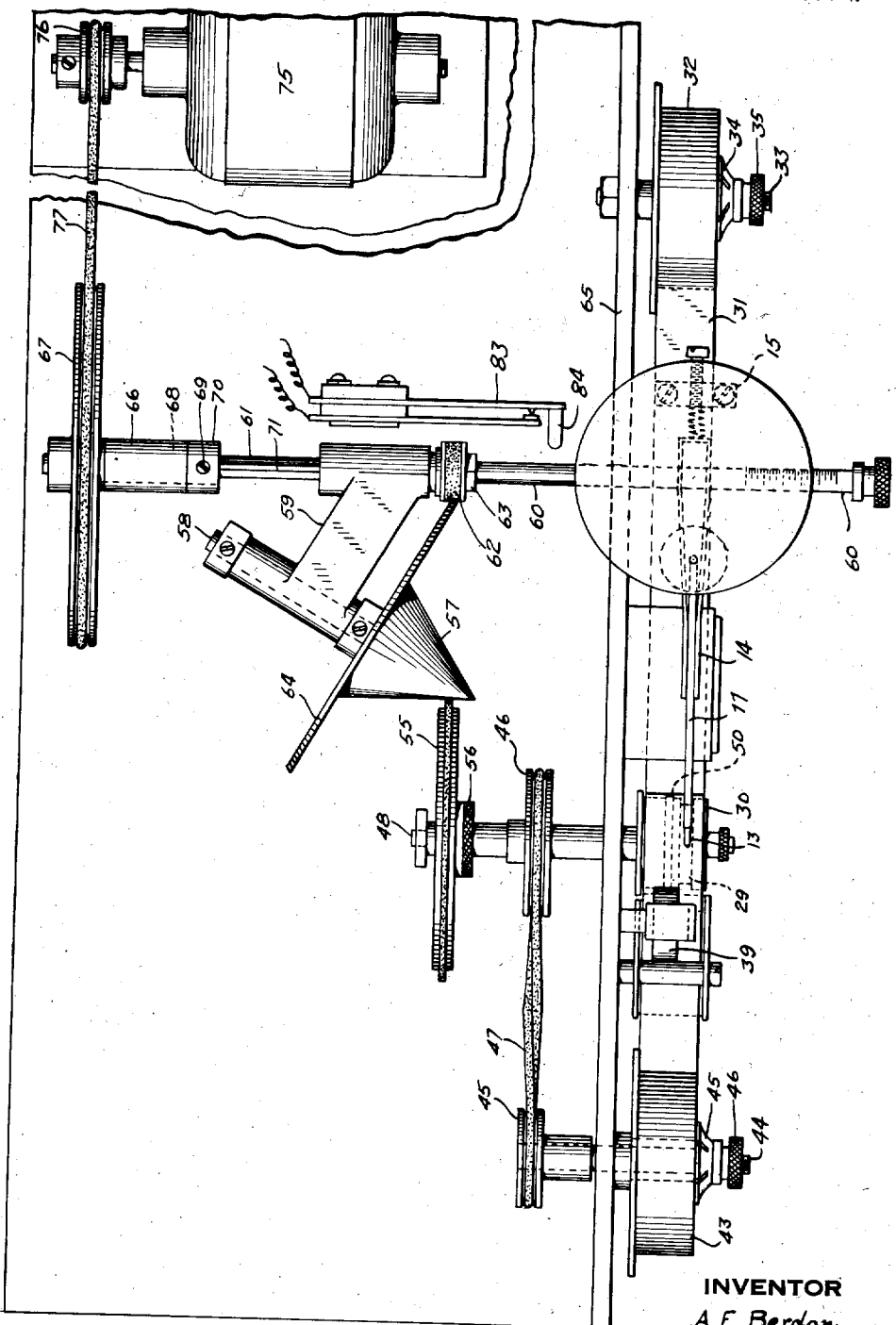
Fig. 2 illustrates the same unit in plan view.

Referring first to Figs. 1 and 2, I have shown at 10 a capillary pen which may advantageously take the form of a silver tube 11, having one end dipping in the ink reservoir 12, and having in its opposite end a finely drawn glass pen tip 13. This is the common form of recording pen, and obviously other types of recording instruments may be used in place of it, such, for example, as a pencil or a stylus.

The pen 10 is balanced in an arm 14, which is pivoted, or preferably, as illustrated in the present case, supported upon a flexible spring strip 15, which allows swinging of the arm 14 to bring the pen tip 13 into and away from contact with a record strip. The spring 16, which, in the present instance, is adjustable as to tension by means of the screw 17, may be provided to balance the effect of the spring strip 15. Preferably the tension of the springs 15 and 16 are so balanced that the tip 13 is pressed lightly against the record sheet when unaffected by other influences.

The arm 14 is connected to an electrical motor means such as, for example, a conventional loud speaker unit, e. g., as shown most clearly in Fig. 3. In the form illustrated, a permanent magnet 20 having pole pieces 21 and 22 cut out to receive the coil 23, and with their ends spaced apart to receive the armature 24, establishes a magnetic field. The armature 24 is made of a paramagnetic material and is surrounded by the coil 23, through which the signal current or the amplified signal current passes. As the armature 24 becomes magnetized by the passage of a current through the coil 23, its opposite ends are attracted to the opposite pole pieces 21 and 22, respectively, and accordingly the armature 24 is tilted one way or the other. By means of the link 25, the movement of the armature 24 is transmitted to the recording instrument 10, so that the recording tip 13 is moved against or away from the record strip, according to the current passing through the coil 23. The action of the armature 24 serves to move the pen in one direction, while the action of a spring moves it in the opposite direction when the magnetic force upon the armature becomes less than the tension of the spring. In the present instance, the springs 15 and 16 are designed to hold the recording tip 13 against the record strip, and as will be hereinafter explained, the receiving circuit is designed to lift the pen 13 away from the record strip until a signal impulse reduces the current strength sufficiently to allow the springs to press the tip 13 once more against the record strip.

Beneath the recording tip 13 is a driving roll 30, grooved as shown at 29 to protect the tip 13 from direct impact on the roll 30. The rotation of this roll 30 serves to move the record strip 31. This strip as shown in Fig. 2 is a narrow strip of paper drawn from the supply roll 32, which is mounted upon an axle 33, and its rotation retarded by the spring friction washer 34, the tension of which may be adjusted by means of the thumb nut 35. Preferably the paper record tape is wound upon a core of lignum-vitae wood to form the friction surface against which the washer 34 bears.

Suitable pulleys 37, 38, are provided to guide the strip from the supply roll 32 to the driving roll 30, and a pressure roll 39 serves to hold the strip against the driving roll 30 so as to prevent slippage therebetween, but does not contact with that part of the paper on which the record has been printed. The roll 39 is rotatably mounted in the swinging arm 40, pivoted at 41 and urged toward the roll 30 by means of a suitable spring not shown. A guide 42 serves to strip the paper from the roll 30 and to prevent it from becoming wound around the driving roll. If desired, a re-wind roll 43 may also be provided. This roll may, like the roll 32, be frictionally mounted upon the axle 44 by means of a spring friction motion 45 and an adjustable thumb nut 46. The axle 44 is driven by means of the pulley 45, 46, and the belt 47, from the axle 48 of the driving roll 30. This drive connection is designed to rotate the re-wind roll 43 faster than the drive roll, so that even at the center of the roll the tape, as it is moved forward by the rotation of the drive roll 30, will be fully wound upon the roll 43. As the size of the roll increases, there will be an increasing slippage between the axle 44 and the roll 43.

In a preferred form, as illustrated in Figs. 1 and 2, the driving roll 30 is composed of two portions movable axially toward each other, and spaced by means of a soft rubber friction washer 50. By means of the nut 51 on the end of the axle 48, the two parts of the roll 30 may be moved together so as to compress the friction washer 50, and thereby to extrude a portion of it above the circumferential surface of the roll 30. This edge of the rubber washer 50 provides an excellent friction engagement with the tape 31, particularly where the tape is pressed against it by the pressure roll 39, and by means of the adjusting nut 51 any wear in the friction washer 50 may be compensated for by additional extrusion.

In order to provide for recording of signals at different rates and for different purposes, I have provided a change-speed drive as shown in Fig. 2. On the end of the axle 48 of the drive roll 30 is mounted a friction gear 55, consisting, in the present case, of two metal plates with a soft rubber disc between them. The metal plates are pressed toward each other by means of the adjusting nut 56.

The cone pulley 57, as shown in Fig. 2, is mounted on a freely rotating axle 58, which is at an angle to the axle 48 such that an element of the surface of the cone 57, through the point of contact with the friction gear 55, is substantially parallel to the axle 48. The axle 58 is mounted in a carriage 59, which is secured to the sliding rod 60, the driving axle and friction gear 62, which like the gear 55 is formed of spaced metallic discs and between them a rubber disc. The adjusting nut 63 provides for extruding the rubber disc to compensate for wear. The axles 58 and 61 are so positioned in the carriage 59 that the rim of the disc gear 64 connected to the cone gear 57 constantly bears against and is driven by the friction gear 62.

The ends of the rod 60 are supported in the panel 65 and in a bearing post 66. In the latter also is mounted the drive pulley 67 and the shaft 61 passes through the center of a bearing sleeve 68 connected to the pulley 67. A screw 69 serves both to hold the ferrule 70 on the end of the sleeve 68 and, by extending into the slot 71 in the shaft 61, to key the latter to the driving pulley 67.

The motor 75, which is preferably mounted upon a separate base, so as to avoid any unnecessary vibration in the recording instrument, drives the apparatus through the pulley 76 and the belt 77.

A bearing post 66 is pivotally mounted upon its base so as to permit a very slight swinging, and a slot 80, where the rod 60 passes through the panel 65, permits such swinging. A detent 81 pressed against the rod by a spring 82 serves to latch the rod 60 at either end of the slot 80, and as a cam to press the cone 57 into engagement, and to provide for satisfactory engagement even after considerable wear.

A contact switch 83 is mounted adjacent the rod 60, and one of the contacts is provided with an insulating block 84 adapted to engage the rod when it is moved to the right hand end of the slot 80. This switch advantageously controls the recorder circuit,—that is to say, the circuit through the loud speaker or other recorder operating unit.

In the operation of the apparatus as thus far described, when the motor 75 is started, the friction gear 62 is driven through the pulleys 76 and 67, the belt 77, the sleeve 68, the screw 69 and the shaft 61. The gear 62, in turn, drives the cone gear 57 through the disc gear 64, and the cone gear 57, when pressed against the gear 55, drives the latter through the axle 48, and thereby rotates the driving roll 30, by which the record strip is fed through the apparatus.

When the motor is being started or stopped, or when it is desired temporarily to interrupt the recording without stopping the motor, the shaft 60 may be moved to the right-hand end of the slot 80. When this is done, the cone gear 57 is moved away from the friction gear 55, and the driving connection to the driving roll 30 thereby is broken. When it is desired again to rotate the driving roll 30, the rod 60 need only be moved to the left-hand end of the slot 80, whereupon the cone gear 57 is moved into engagement with the friction gear 55 and the driving connection again established.

By means of the rod 60, a change in speed may also be effected merely by sliding the rod lengthwise. Since the element of the cone 57 at the point of contact with the gear 55 is parallel to the shafts 48 and 61 and the rod 60, the longitudinal movement of the rod 60 will effect a movement of the cone 57 without affecting the engagement between it and the gear 55. Thus the gear ratio between the cone gear 57 and the disc 55 may be varied at will to vary the speed of the drive roll 30. The exposed end of the rod 60 may be graduated as shown in Fig. 2. If the instrument is used for recording code messages, this graduation may indicate the rate of reception, e. g., in words per minute. For other purposes it may be preferable to indicate revolutions per minute, or any other speed indication may be represented.

Obviously, the length of each record stroke will depend upon the length of the signal impulse. Accordingly, with slow signals, economy of space on the record strip may be effected by slowing down the rate at which it is driven, without impairing the legibility of the record. With more rapid signals, however, a greater speed of the paper drive may be required in order satisfactorily to distinguish between the dots and dashes and satisfactorily to space the signals. This is readily accomplished as already described above. Since with any given setting of the speed change drive the length of the record stroke is proportional to the length of the signal impulse, this device may be used in telegraph instruction and practice to record both the regularity and speed with which the dots and dashes are formed by the transmitting key. Furthermore, in a case where the dots and dashes are not clearly distinguished by the sender, so as to be difficult of reception by the ear, the record permits of accurate measurement.

In the preferred embodiment of the invention, an automatic time stamp is provided, which is most clearly shown in Fig. 1. This may consist of a clock mechanism 85 having a succession of time figures 86 marked on a suitable wheel 87, so as to be brought successively by the clock mechanism to the printing position at the bottom of the wheel 87. The record strip 31 passes beneath the wheel 87 and beneath the record strip is a printing table 88 of substantial mass and supported in the bracket 89 by means of springs 90. A cam 91 on the printing table 88 is engaged by a cam 92 on the wheel 87 just before each time character 86 comes into printing position. By means of these cams, the printing table is pushed away from the wheel 87 and the springs 90 are compressed. At the printing position, the cam 92 rides over the point of the cam 91 and the printing table is released. The pressure of the springs 90 thereupon drives the table toward its normal position, but because of its inertia, it will overthrow, to some extent and consequently will drive against the character 86 on the wheel 87. Since the strip 31 lies between the two, the printing of the character upon the strip will result. Obviously any other type of time printing mechanism could be utilized.

Although the device as just described may be used on any circuit with sufficient current strength, and on which the signals are represented by a change in average potential, it frequently will be necessary to amplify minute currents which are available; and if the signals are imposed upon alternating currents or direct currents of fluctuating potential, in which the signal is represented by a change in the amplitude of the fluctuation without a change in average potential, it will be necessary to produce a distortion which may advantageously be accompanied by amplification. In Fig. 4, I have shown a circuit suitable for effecting such distortion and amplification. In this case, the signal current from a suitable radio detector is received through the terminals 100 and 101. The ear phones 102 may be connected directly to these terminals, or may be connected through the variable resistance 103. If the current received at the terminals 100 and 101 were sufficiently strong, the loud speaker, or other recorder operating unit, could also be connected directly to these terminals, and the difference in current requirement of the loud speaker and the ear phones could be accommodated entirely by the variable resistance 103. Since, however, most radio receiving sets and monitors for sending are provided with amplification only sufficient to give comfortable signals on the head phones, it will ordinarily be necessary further to amplify, and advantageously further to distort the signal current. With amplification as shown in Fig. 4, the variable resistor 103 may be omitted, and the difference in current strength produced entirely by the am-current amplification without affecting the usual phone signals in any way. In this latter case, the volume control 104 may be included and any form of amplification may be used, whether resistance, impedance, transformer, or any combination of them, except that an output transformer should not be included between the amplifier plate circuit and the recorder. In the circuit as illustrated in Fig. 4, I have included a filter device consisting of a choke coil 105, and condensers 106 and 107 for the purpose of damping out vibrations. Instead of this device, a weight 26 as shown in Fig. 3 may be used on the recording instrument or upon the armature of the loud speaker or other recorder operating unit. The filter, if used, tends to smooth the ripples in the plate current of the amplifier, and the weight, if used, serves to reduce the chromatic or resonant period of vibration of the recording unit to a value below that which will be encountered in using the device. With either of these expedients, the reception may be kept substantially silent. Advantageously, however, the ear phones 102 may be omitted and, at the same time, by omitting both the filter device 105, 106, 107, and the weight 26, the armature 24 and the recording instrument 10 may be made to vibrate so as to produce an audible buzzing without impairing their recording function. On the contrary, this vibration may have the desirable effect of making doubly sure that the pen will feed satisfactorily to produce a clear record.

Whatever amplification is used to bring the radio signal up to the current strength sufficient to operating the recording unit should be designed to produce distortion. This distortion may be secured by the choice of a tube and the adjustment of plate and grid potentials so that the tube operates upon a curved portion of its characteristic curve, i. e., the curve which results from plotting plate current against grid potential. In this way, a change in the amplitude of fluctuations in the grid potential results in a greater change in plate current on one side of the average than on the other, and consequently in a resultant change in the average plate current which may be utilized in the magnetic recorder operating unit.

In the circuit shown in Fig. 4, the grid bias 108 serves to keep the electron tube 109 operating within a curved portion of its characteristic curve.

If the tube is operated near the top of its characteristic curve, that is, where the curve begins to flatten, the average plate current will become less with an increased amplitude in the fluctuations of the grid potential. It is an advantage to operate in this way when a pen is being used, because the pen may then be made to rest against the paper when the device is inoperative, and the recorder circuit is open. However, as soon as the recorder circuit is closed, the current flowing therethrough with no signal will be sufficient to raise the pen away from the paper, while a signal will so far reduce the current as to permit the pen again to contact with the paper. This is obviously working backwards from the usual form of recorder, in which the recording instrument is moved against the record sheet by an increase in current when the signal is received.

The terminals 110 and 111 connect the amplification circuit to the recorder circuit shown in Fig. 3. The remainder of the circuit shown in Fig. 4 is conventional, and will be readily understood by those skilled in the art, without further explanation.

In Fig. 5 is illustrated a modified form of the invention which may be used for making a record by perforating tape, or for making duplicate records, or in other cases where the recorder requires a stronger current. In this case, the arm 10a, corresponding to the arm 10 of Figs. 1 to 3, is driven by the link 25 from the loud speaker, or other recording operating unit. However, in this case the arm 10a, instead of serving itself as the recording instrument, is a relay contact, and may control the recorder operating circuit. I have shown the circuit as composed of an electrode 120 with an armature 121 beneath the tape 31. A perforating point or stylus 122 on the armature 121, operating against the back plate 123, serves to perforate or otherwise to record upon the tape 31 the signals as received.

It is a very important feature of my invention that a steady D. C. component through the winding 21 does not impair the sensitivity of the device, at least in any noticeable degree, whereas in relays in similar devices that have been available heretofore, the sensitivity is very much dependent upon the maintenance of the 0, or very minute initial current. Thus, for example, the device of my invention appears as sensitive upon a change of current from 9 to 10, or from 10 to 9 milliamperes, as upon a change from 0 to 1, or 1 to 0 m. a. The reason for this remarkable performance is apparently because the armature 24 is magnetically balanced in the very small air gap, and because the flux of the permanent magnetic field remains always substantially the same, and does not pass longitudinally through the armature. Thus the armature 24 is free to be magnetized only by the signal current. This feature of the invention makes it particularly valuable where minute currents are to be used, as in radio, photoelectric, and other circuits operating upon very small currents.

Although I have shown in the accompanying drawings and have described above a preferred embodiment of my invention, and certain modifications thereof, nevertheless, it is to be understood that many other embodiments and modifications may be made without departing from the scope of my invention. As will be readily appreciated by those skilled in the art, many of the elements used in my invention are devices familiar to the art in other uses, and it will of course be understood that other equivalent devices may be substituted without essentially changing the principle and operation of the apparatus as described and claimed herein.

What I claim is:

1. A system for recording signals superimposed on alternating carrier current which comprises a receiving circuit having a vacuum tube output including distorting network, electromagnetic recorder directly connected to the said vacuum tube output, the recorder having a magnetic field continuously magnetized during operating and an armature cooperating with the magnetic field and the recorder having electrical constants approximately matching the impedance of the vacuum tube output circuit at the signal note frequency.

2. A system for recording electrical impulses superimposed on a high frequency carrier current which comprises a receiving circuit capable of being tuned to said high frequency current and having an electron tube output with associated distorting network, the constants of which cause a steady maximum current flow in the plate circuit of the tube in the absence of signal impulses and a lower average current whenever signal impulses are detected by the electrode tube, an electromagnetic recorder directly connected to the output circuit of the electron tube, the recorder having electrical constants approximately matching the impedance of the output circuit of the electrode tube at the signal note frequency, the recorder having a spring loaded recording pen and a permanent magnetic field of such strength that the maximum steady plate current of the electron tube is sufficient to withdraw the pen from a recording surface in opposition to the pull of the spring.

3. A circuit according to claim 2 in which the output circuit of the electron tube is provided with a filtering means operative to filter out audio-frequency pulsations.

4. A system according to claim 2 in which the magnetic recorder is provided with mechanical damping means effective at audiofrequencies.

5. A system for simultaneously recording electrical telegraph signals of the continuous wave type superimposed on a high frequency carrier current by both visible and audible means which comprises a receiving circuit capable of being tuned to the carrier current frequency and containing an electron output tube having associated therewith a distorting network, an electromagnetic recorder connected to the output circuit of the electron tube and having electrical constants approximately matching the impedance of the output circuit at signal note frequency, said recorder having a permanent magnetic field during operation and an armature connected to a recording pen, the armature being spring loaded so as to contact the pen with the recording surface when signals are present in the output circuit of the electron tube, the armature also being responsive to pulsations of the note frequency and having sufficient vibrating surface to give an audible note at the signal note frequency when signals are received and distorted by the electron tube, the armature having likewise associated with it a recording pen and a spring, which spring normally holds the recording pen in contact with the recording surface, the spring tension being adjusted so that the normal plate current in the output tube will move the pen out of contact with the recording surface, the spring tension being adjusted so that the normal plate current in the output tube will move the pen out of contact with the recording surface.

6. In a recording device, a paper feeding mechanism comprising a drive roller, a pressure roller, means for pressing the pressure roll against the drive roll, a friction gear connected to the drive roll, a friction cone movable radially against and away from said friction gear, means for shifting the relation of said cone to said gear, whereby to change the ratio of their circumferences at the point of contact between them.

7. In a recording device, a paper feeding mechanism comprising a drive roll, a pressure roll, means for pressing the pressure roll against the drive roll whereby to hold the paper against slipping on said drive roll, a friction gear connected to the drive roll, a friction cone adapted to drive said friction gear, a carriage upon which said cone is rotatably mounted, said carriage being movable transversely to bring the cone into and away from engagement with the friction gear and longitudinally in a direction parallel to the axis of said friction gear, the friction cone being mounted upon said carriage at an angle to its direction of longitudinal movement which is substantially equal to the angle between its axis and an element of its surface, whereby said carriage may be moved longitudinally without affecting the engagement between the cone and the friction roll, a shaft rotatably supported in said carriage substantially parallel to the direction of longitudinal movement and movable transversely therewith, a driving connection between said cone and said shaft means for driving said shaft and a sliding connection between said shaft and one of the power transmitting means connected thereto, whereby to permit the longitudinal movement of the carriage without affecting said power transmitting connections.

8. In a recording device, a combination as defined in claim 6, which further includes an electrical recorder and a contact switch in the circuit of said recorder, which contact switch is mechanically connected to the means for shifting the relation of the cone to the friction gear, whereby movement of the cone radially away from the friction gear serves also to open the recorder circuit.

9. In a recording device, the combination as defined in claim 6, in which the drive connections are accurately balanced to avoid vibration, and a motor by which said connections are driven is positioned away from the recording device so that vibrations of said motor will not be transmitted thereto, and the transmission between the motor and said drive connections is sufficiently flexible to absorb vibrations of the motor without substantially transmitting them to the recording device.

ALBERT E. BERDON.